US011667852B2

(12) United States Patent
Chalifoux et al.

(10) Patent No.: US 11,667,852 B2
(45) Date of Patent: Jun. 6, 2023

(54) ELECTROMAGNETIC HYDROCARBON DEPOLYMERIZATION PROCESS

(71) Applicant: AmeriCarbon Products, LLC, Morgantown, WV (US)

(72) Inventors: Gilbert A. Chalifoux, Mississauga (CA); E. Gordon Eberth, Calgary (CA); David Allen Berry, Mount Morris, PA (US)

(73) Assignee: AmeriCarbon Products, LLC, Morgantown, WV (US)

( * ) Notice: Subject to any disclaimer, the term of this patent is extended or adjusted under 35 U.S.C. 154(b) by 0 days.

(21) Appl. No.: 17/330,513

(22) Filed: May 26, 2021

(65) Prior Publication Data
US 2021/0284920 A1    Sep. 16, 2021

Related U.S. Application Data

(63) Continuation of application No. PCT/CA2019/000160, filed on Nov. 26, 2019.

(60) Provisional application No. 62/771,657, filed on Nov. 27, 2018.

(51) Int. Cl.
*C10G 47/02* (2006.01)
*C10G 1/08* (2006.01)
*C10G 1/06* (2006.01)
*B01J 19/12* (2006.01)

(52) U.S. Cl.
CPC ............ *C10G 47/02* (2013.01); *B01J 19/126* (2013.01); *C10G 1/065* (2013.01); *C10G 1/083* (2013.01); *B01J 2219/089* (2013.01); *B01J 2219/0877* (2013.01); *B01J 2219/0879* (2013.01); *B01J 2219/0892* (2013.01); *C10G 2300/1003* (2013.01); *C10G 2300/202* (2013.01); *C10G 2300/4006* (2013.01); *C10G 2300/4012* (2013.01); *C10G 2300/4081* (2013.01); *C10G 2300/708* (2013.01)

(58) Field of Classification Search
CPC ................... B01J 19/126; B01J 19/129; B01J 2208/00026; B01J 2219/0877; B01J 2219/0879; B01J 2219/089; B01J 2219/0892; C10G 1/065; C10G 1/083; C10G 2300/1003; C10G 2300/202; C10G 2300/4006; C10G 2300/4012; C10G 2300/4081; C10G 2300/708; C10G 32/02; C10G 47/02
See application file for complete search history.

(56) References Cited

U.S. PATENT DOCUMENTS

2011/0036706 A1*  2/2011  Van Thorre ............... C10G 1/10
                                                        422/186.29
2017/0369786 A1*  12/2017 Dalton ................... B01J 19/122

FOREIGN PATENT DOCUMENTS

CA           2977686 A1 *  9/2016  ............... C10C 3/06

* cited by examiner

*Primary Examiner* — Ellen M McAvoy
*Assistant Examiner* — Chantel L Graham

(57) ABSTRACT

Applying electromagnetic energy to a hydrocarbon feed in the presence of at least one of a solvent, a catalyst, an electromagnetic receptor or a hydrogenation agent may result in depolymerization and compositional modification of the hydrocarbon feedstock into at least one of smaller hydrocarbon product fractions or viscosity modification.

19 Claims, 5 Drawing Sheets

ELECTROMAGNETIC HYDROCARBON DEPOLYMERIZATION PROCESS

CLAIM TO PRIORITY

This application is a bypass continuation of International Application PCT/CA19/00160 entitled "ELECTROMAGNETIC HYDROCARBON DEPLOYMERIZATION PROCESS", filed Nov. 26, 2019.

PCT/CA19/00160 claims the benefit of U.S. Ser. No. 62/771,657 entitled "ELECTROMAGNETIC HYDROCARBON DEPLOYMERIZATION PROCESS, filed Nov. 27, 2018.

The disclosures of all patents and applications referred to herein are incorporated hereby by reference in their entireties and for all purposes.

BACKGROUND

Field

This disclosure involves the use of electromagnetic energy in the form of radio frequency or microwave along with an appropriate solvent and/or catalyst/sorbent to depolymerize and/or desulfurize a heavy hydrocarbon feedstock to produce a variety of hydrocarbon products and/or compositional modify.

SUMMARY

In an aspect, methods of conducting depolymerization or compositional modification of complex hydrocarbon feedstock compounds in a solvent comprise electromagnetic radio frequency and/or microwaves, and may further comprise one or more of microwave sensitizer, receptor materials, or catalyst. In an aspect, a method includes mixing a hydrocarbon feedstock with at least one of a solvent, a catalyst, an electromagnetic receptor or a hydrogenation agent to form a mixture; selecting at least one parameter of electromagnetic energy, wherein the at least one parameter is selected to result in at least one of a depolymerization and a compositional modification of the hydrocarbon feedstock into at least one of smaller hydrocarbon product fractions or a viscosity modification; and applying the electromagnetic energy using the at least one parameter to the mixture. The hydrocarbon feedstock compounds may include coal, sub-bituminous coal, lignite coal, anthracite coal, biomass, shale, oil sands, liquids comprising a portion of oil sands crude, bitumen (e.g. surface-mined or deep extraction) and related derivatives (and may be mixed with a high temperature depolymerizing medium consisting of heavy hydrocarbon oils and may include liquids chosen from the group consisting of: coal tar distillate, decant oil, anthracene oil, and heavy aromatic oils) while the solvent may be a mixture of lighter hydrocarbon liquids and or hydrogenation agents (such as soybean oil, other biomass derived oil, and other oils, such as forestry waste commonly referred to as black liquor or other equivalent material usually called brown liquor, but the terms red liquor, thick liquor and sulfite liquor are also used, lignin, petroleum oil, pyrolysis oil) including addition of hydrogen containing gases (such as natural gas). The solvents may also include, but are not limited to, pipeline crude oil, rubber tires, animal waste, anything with the potential of adding a proton to an aromatic or breaking a chemical bond, horse manure, chicken manure, sewage sludge, any bio-waste with lignin, peanut oil, canola oil, olive oil or other vegetable oil, decalin, petroleum distillate, recycle oil, Fisher-Tropsch liquid, methyl naphthalene, decahydronaphthalene, tetrahydronaphthalene, methyl naphthalene, creosote oil, coal tar pitch, asphalt pitch, gasification tar and distillates thereof, recycled motor oil, petroleum distillates, rubber, plastics, recycled plastics (e.g. polystyrenes), recycled rubber, biomass derivatives, liquefied coal, liquefied biomass, shale oil, liquefied process gas, cacenaphthenes, di, tetra- and octahydroanthracenes, tetrahydroacenaphthenes and other derivatives of partially hydrogenated aromatic compounds, petroleum catalytic cracker products, products from the pyrolysis of recycled hydrocarbons, recycled fractions such as from executing the methods and systems described herein, and aromatic oil products obtained from the distillation of shale oil or tar sands.

The chemical reaction of the reactant mixture may be controlled through the electromagnetic energetics to produce an intentional and selective variety of depolymerized or modified hydrocarbon products. The process is also capable of in situ desulfurization of the sulfur containing hydrocarbons with catalyst and/or sorbent addition.

The catalyst may at least one of facilitate hydrogenation of higher hydrocarbon compounds, assist in the dehydrogenation of the natural gas species, react with the sulfur bearing hydrocarbons to form hydrogen sulfide, or react with the sulfur and forms a metal sulfide that then becomes a catalytic hydrogenation agent and can later be separated from a product for desulfurization. The electromagnetic receptor may serve as a support for the catalyst and comprises at least one of carbon or a metal oxide. A support for the catalyst may be at least one of a bi-functional microwave receptor and a sulfur sorption media.

The electromagnetic energy may be a microwave energy between 300 MHz and 300 GHz and may be at least one of continuous, variable, or pulsed. The electromagnetic energy may be a radio wave that is less than 300 MHz, wherein the radio wave energy is continuous, variable, or pulsed. Products of the methods and systems described herein may include at least one of light gaseous hydrocarbons, middle hydrocarbon distillates, heavy hydrocarbon distillates, tars, pitch, solid carbon, lower viscosity bitumen, or upgraded hydrocarbon distillate fractions. The electromagnetic energy may be tuned to maximize solvent uptake through water exchange.

Supplemental thermal heat may be added to bring a temperature of a reactor executing the methods and systems described herein to a point of chemical reaction. The reactor may be batch, continuous, fixed bed, or fluidized bed. The methods and systems described herein may be performed under a pressure of between 1 atmosphere and 80 atmospheres. The temperature may be between 100 degrees centigrade and 1000 degrees centigrade. At least one of a middle distillate product fraction or a spent catalyst fraction of the methods and systems described herein may be recycled to the inlet of a reactor executing the methods and systems described herein. A spent catalyst fraction may be recycled to the inlet of a reactor executing the methods and systems described herein. The methods and systems described herein may further include passing an effluent generated by execution of the methods and systems described herein through a fractional distillation process to at least one of purify a partially upgraded bitumen and recover the catalyst and solvent for recycling. The methods and systems described herein may further include further desulfurizing a partially upgraded bitumen via a conventional thermal reactor or an embodied microwave-driven oxidative sulfur polishing reactor. The methods and systems described herein may further include tuning a secondary microwave reactor with an optimized catalyst and oxidant to perform oxidative desulfurization of the bitumen.

In an aspect, a reactor may include a reservoir that receives a slurry of a coal and a solvent; an electromagnetic energy generator positioned to apply electromagnetic energy to the slurry in the reservoir; at least one heating band positioned on a portion of the reservoir to impart thermal energy to the slurry; and an outflow of the reservoir for obtaining digestate from the reservoir.

While examples presented herein relate to two particular main embodiments, it should be understood that aspects of the disclosure generally apply broadly to heavy hydrocarbon-based based systems.

These and other systems, methods, objects, features, and advantages of the present disclosure will be apparent to those skilled in the art from the following detailed description of the preferred embodiment and the drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

BRIEF DESCRIPTION OF THE FIGURES

The disclosure and the following detailed description of certain embodiments thereof may be understood by reference to the following figures.

DETAILED DESCRIPTION

Figure 1:
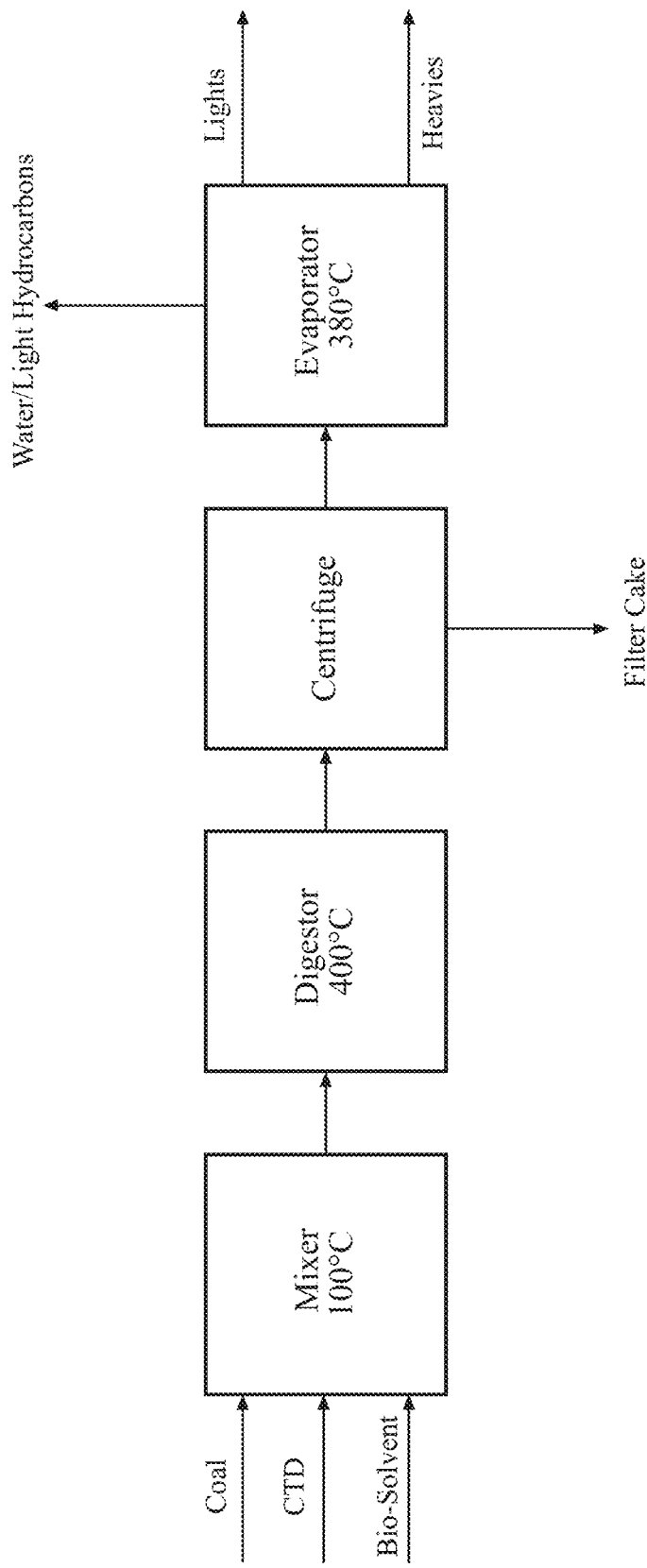
FIG. 1 depicts a prior art coal liquefaction system.

Referring to FIG. 1, the use of solvents to dissolve coal has been the basis of much activity for coal liquefaction-related processes. Processes have been developed (such as a hydrogen solvent donor coal liquefaction process) in which coal was mixed with and reacted with hydrogen containing solvents (e.g. CTD, bio-solvent) at high pressure and high temperature to produce petroleum-like liquid products. Processes have been developed that utilized a recycled coal distillate solvent and other additives to produce naphthalene and other middle distillates and tar compounds. Such processes may include centrifugation to yield a filter cake and centrate, and evaporation of the centrate to yield lights, heavies, water, or light hydrocarbons.

Figure 2A:
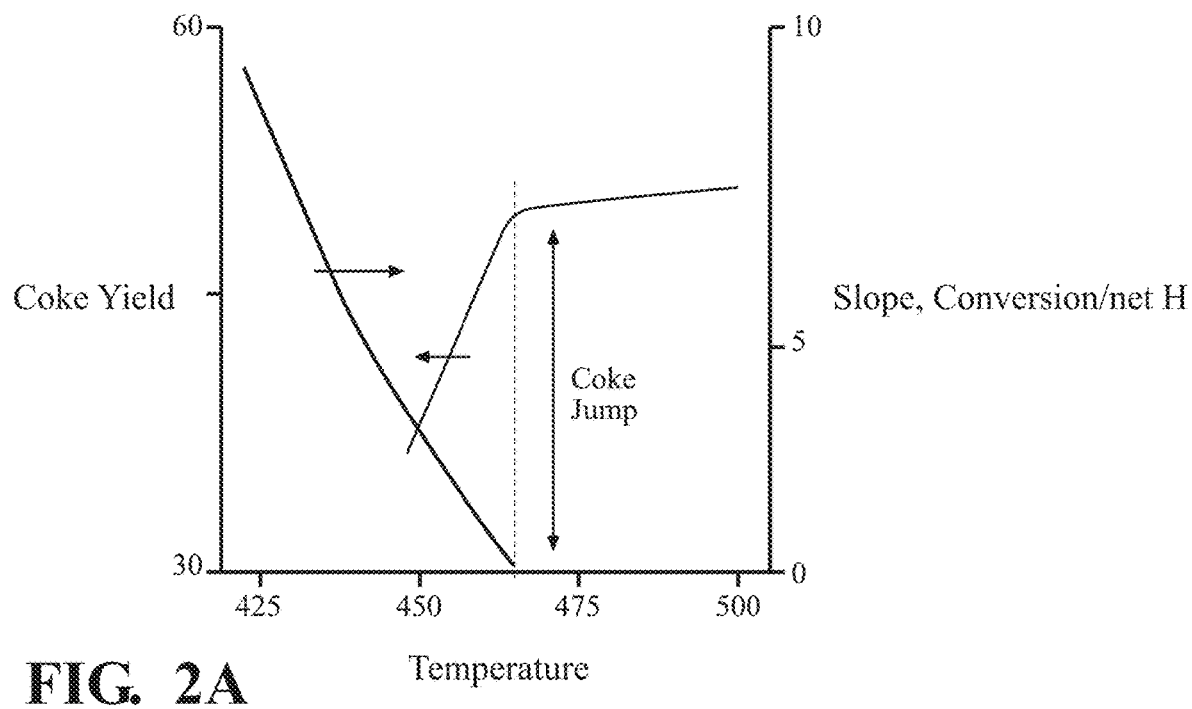
FIG. 2A depicts the relationship between temperature and coke yield.

While these types of processes provide for a useful way to convert coal into chemicals, there remains a need for an improved process that is less challenging and has greater potential yield. For example, and referring to FIG. 2A, the temperatures typically necessary for liquefaction to occur (>400° C.) are within the range where unwanted carbon formation reactions occur (e.g. 425° C.-450° C.).

Figure 2B:
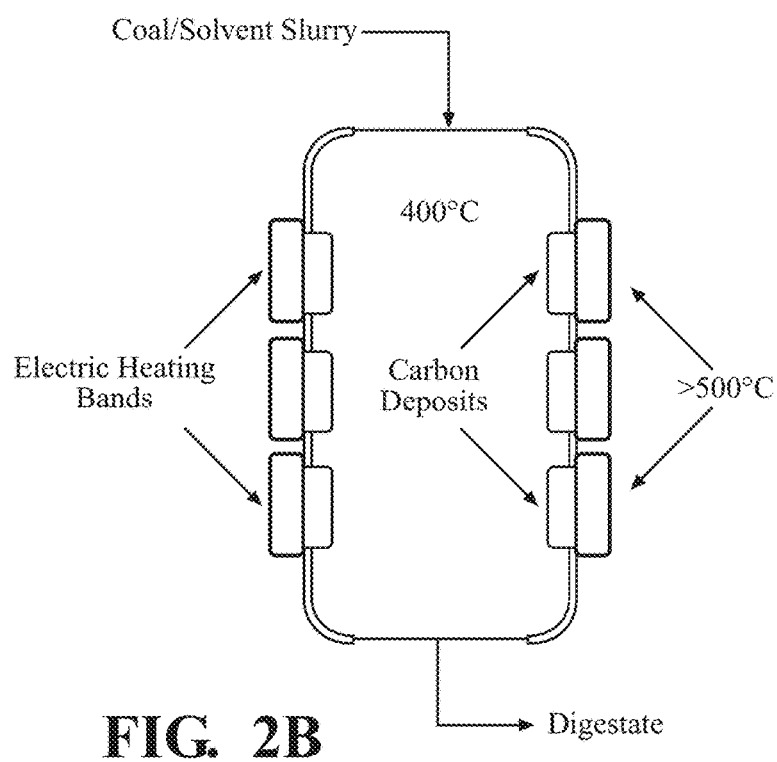
FIG. 2B depicts an embodiment of a reactor.

Hydrogenated solvents or hydrogen donating compounds are often added to the coal/solvent mixture to ensure more complete dissolution of the coal. This can lead to not only increased costs, but also difficulty in controlling over-hydrogenation of coal compounds that can limit yield of possible desired aromatic (hydrogen-deficient) products such as coal tar/pitch. Conventional processes may lack the ability to control temperature throughout the reactor volume causing localized hot-spots with subsequent carbon deposition on the reactor walls, such as shown in FIG. 2B.

Figure 3:
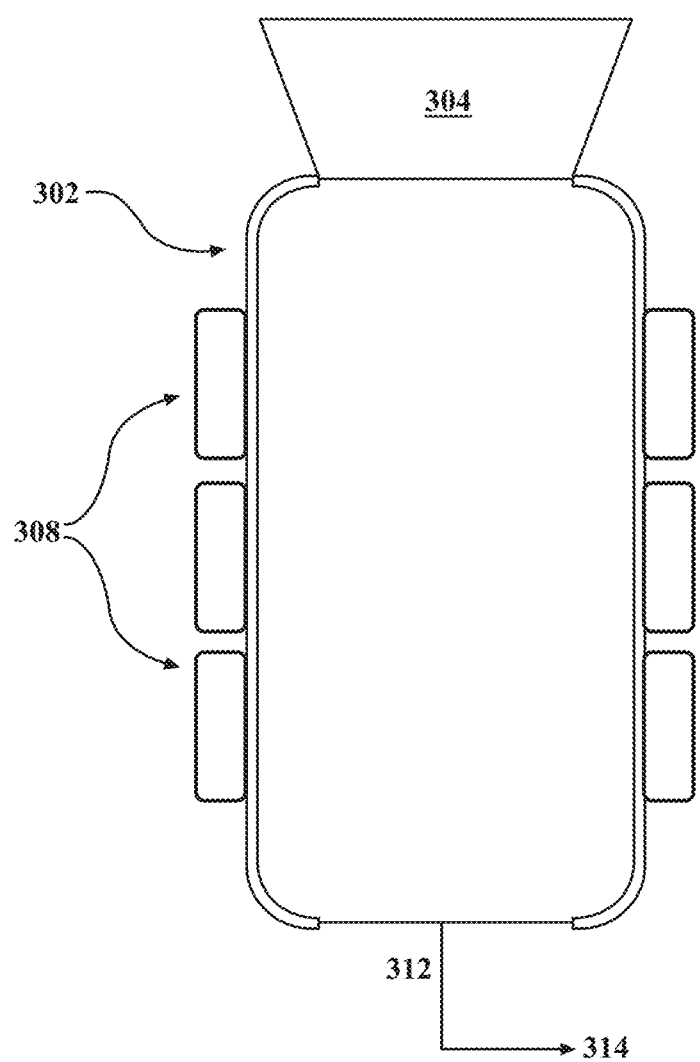
FIG. 3 depicts an embodiment of this disclosure.

In the disclosed processes and systems, coal may be mixed with a solvent at an appropriate ratio and temperature (for example, approx. 100° C.) to maximize the exposure of the coal to the solvent in a reactor 310. The coal solvent mixture 302 may then be exposed to an electromagnetic energy (such as microwave energy) from an electromagnetic energy generator 304 with optional supplemental thermal energy, such as from heating bands 308, wherein the optional supplemental thermal energy may be supplemented to the extent of optimum process heat integration, and brought to a temperature of ideally less than 400° C. (but which may be higher or lower). An outflow 312 may allow access to digestate 314. An example embodiment is shown in FIG. 3. Throughout this disclosure, electromagnetic energy, microwave energy, and RF energy/radio waves may be used interchangeably and should be understood to be interchangeable in the methods and systems described herein.

The contribution of any optional conventional thermal energy may be limited so that the coal solvent mixture never approaches beyond approximately 400° C. (or an alternative desired temperature). The microwave energy may be tuned to the surface of the coal where it preferentially applies its energy, rather than to the solvent. For example, coal, its impurities, and any intentional catalyst on the coal surface may have a higher dielectric constant than the solvent or reactant gases. As a result, any microwave energy imparted to the system may, in embodiments, preferentially be absorbed by those higher dielectric materials. In general, for a reaction system with multiple materials with varying dielectric constants, those materials with the higher dielectric constant will absorb more energy imparted by an electromagnetic wave. This difference can be manipulated to more preferentially target that energy with the intent to maximize the more favorable reactions of interest. For example, one may design a catalyst to have a much higher dielectric constant than the other reactants in the coal slurry mix and thereby maximize the energy at the site of reaction, the catalyst. This may allow more precise control over the reaction site and may avoid the typical thermally induced undesired carbon formation that is characteristic of conventional thermal processes. Not only is carbon formation reduced, proper selection of one or more of the microwave energy, coal or solvent may provide for a maximized coal depolymerization and higher yield of desired product. Separation of the various hydrocarbon fractions from the depolymerized coal may occur by fractional distillation-type processes along with centrifugal, cyclone and/or filtrate separation of the inorganic fraction. One or more hydrocarbon fractions may be targeted products, while a coal middle distillate type fraction may be collected and recycled back to the beginning of the process to serve as solvent/carrier for the process (which may occur on a continuous basis).

To enhance depolymerization, hydrogen-containing solvents may be used or, in embodiments, a hydrogen containing gas (such as hydrogen or methane) may be added to the reactor. Depending on the coal composition, it may be desirable to add a receptor catalyst, such as hematite or a doped metal oxide high dielectric material catalyst, to focus the energetics as described herein to produce the hydrogen in situ. It is important to note that the formation of microwave-induced plasmas may be minimized/avoided, such as by avoiding the use of metal catalysts and/or minimizing the power density of the wave, which may be beneficial as plasmas are often energy inefficient and difficult to control in both the primary and unwanted secondary reactions. The addition of catalyst/receptor material may also be added to accomplish in situ desulfurization of the coal. There are a variety of sulfur compounds present in coal and the microwave energetics can be concentrated on evolution of those compounds such as in the form of hydrogen sulfide separated from light gas fractions or bound or sorbed by the catalyst material itself (for example, FeS). In some cases, an absorbent can be added to the reactor to serve as both a microwave receptor and sorption material (for example, ZnO) that can be later separated out of the solid effluent fraction.

The use of microwave energy may have certain advantages over conventional thermal energy, as detailed herein. One advantage may be the ability to more significantly apply microwave energy preferentially to the coal rather than the solvent or produced product fractions. This allows more energy to be applied more directly and efficiently to the reaction site rather than globally to the entire reactor volume, such as in thermal systems which are constrained. The result is not only less energy consumed, but typically lower overall temperatures, which in this case avoids undesirable reactions (such as carbon formation).

Another advantage of the use of microwave energy may be the ability to tune (including frequency, power, pulse period) the microwave to a specific coal type due to a coal's inherent dielectric properties (including carbon structure and inorganic fraction), which can significantly govern where that energy is absorbed. This aspect may allow energetics to be applied in a surgical and precise manner to accomplish chemical reactions on the unique surface reactions site of the coal. This may allow not only more precise and prescribed custom control of differing coal types, but also may allow customization of desired coal chemistries. For example, conventional thermal liquefaction processes may rely on either high temperature, high hydrogen donor solvent or a combination thereof to accomplish high coal depolymerization yields. While this may be a goal, an undesired consequence may be the prior mentioned undesired carbon formation along with lower product yields typically resulting from over-hydrogenation of the hydrocarbon product fractions. More precisely applied microwaves can avoid the high temperature carbon forming regions as well as minimize the need for high hydrogen solvents and thus over-hydrogenation of products.

Another advantage of the use of microwave energy may be the ability to better effect coal solvation. Various studies indicate the benefit for an optimum water content for solvent exchange into the coal pore structure. High thermal energy can evaporate the water before solvent exchange can occur or at a minimum require a second stage. Microwave interaction can be tuned, as described herein, to the water molecule due to the polar molecule nature when influenced by the alternating microwave magnetic field to cause enhanced activity and solvent exchange thereby enhancing reaction rate and extent (for example, resulting in more dissolved coal).

Another advantage of the use of microwave energy may be that microwave responsive receptor material and/or catalysts can be imparted to the coal prior to solvation and subsequent digestion. This can allow energetics to be supplied selectively to the coal surface to effect reactions. Alternatively, a hydrogenation specific microwave catalyst, such as those containing nickel, copper, cobalt, palladium, rhodium, ruthenium, and a hydrogenation agent (such as an H-donor solvent, hydrogen, methane and the like) can be added to the coal to enhance compositional product modification.

Another advantage of the use of microwave energy may be the ability for simultaneous reaction enhancement and sulfur removal. For example, the catalytic action of iron (Fe) and subsequent reaction with liberated sulfur to form FeS. The sulfur forms a solid phase and is recovered downstream during ash filtration of the product. A significant fraction of $H_2S$ in the gas phase is also expected and can be removed with the light gases.

In the case where the desired depolymerized coal product is an anisotropic mesophase pitch (which typically requires depolymerization and additional reaction), the applied electromagnetic field characteristic of microwaves can maximize that production. Pitch is predominately comprised of aromatic ring compounds that can be broadly separated into isotropic and mesophase pitch. Isotropic pitch shows no particular directional orientation. Mesophase pitch on the other hand is comprised of aromatic compounds aligned in a single direction. Because of the electronic "electron cloud" structure of aromatics, the rings have a propensity to align when subjected to an electromagnetic field, which could increase the production of mesophase pitch.

Another advantage of the use of microwave energy is that this technology may be inherently modular. In embodiments, economies of scale are not as influential, which allows for smaller plants to be built near the source of mine-mouth locations. This allows for ease of capital financing, more direct locating and decreased transportation costs. It also mitigates potential total plant outage as capacity is built and maintained through multiple product trains and locations.

Figure 4:
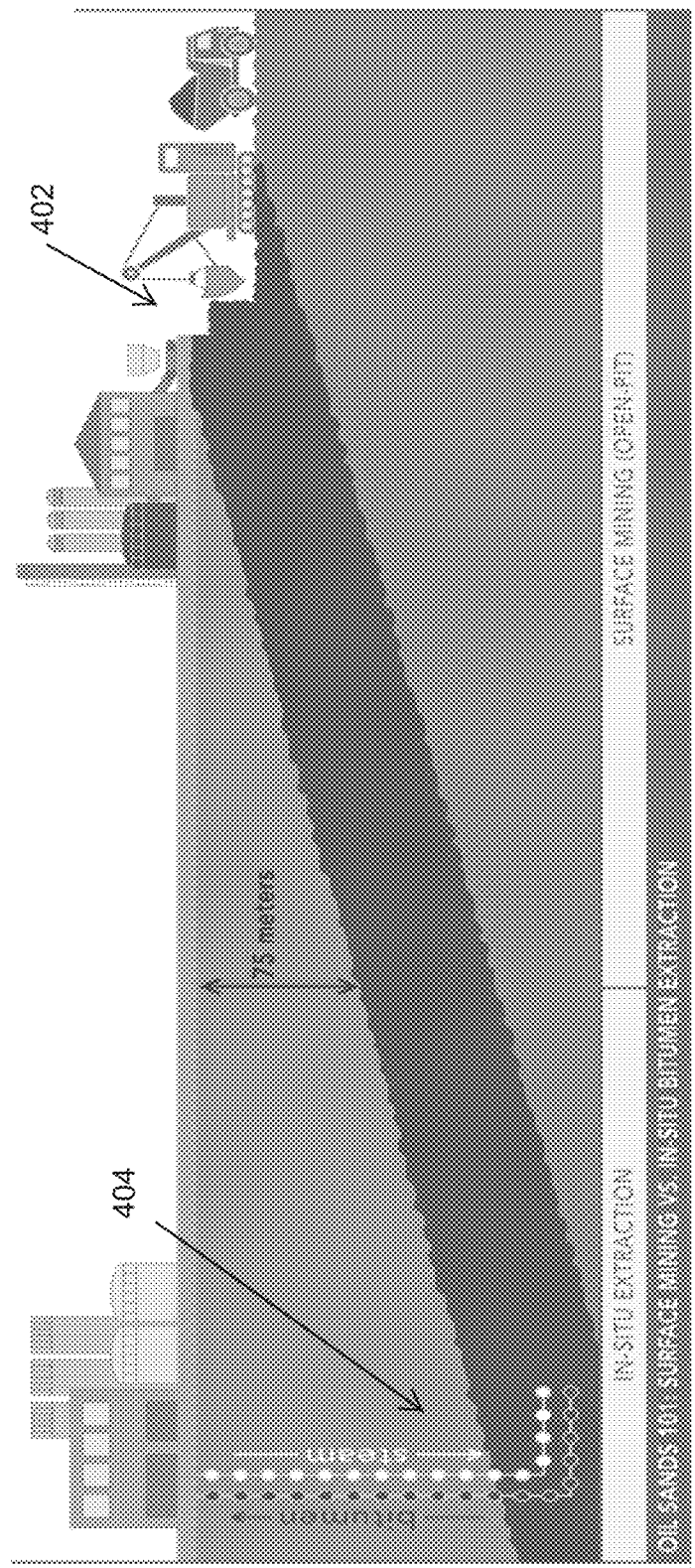
FIG. 4 depicts a graphical representation of surface mining vs. in situ bitumen extraction.

Turning our attention to bitumen viscosity reduction/desulfurization, Alberta oil sands accounts for over 96% of Canada's oil reserves. Bitumen, the viscous hydrocarbon constituent in the oil sands accounts for about 10% by weight with the balance consisting of approximately 5% water, 65% silica and 20% clay and other solids. Referring to FIG. 4, surface oil sands are physically mined and transported to gravity separation plants to separate the bitumen 402. Deeper oil sands are processed with steam to extract the bitumen from below the ground 404.

Of the total bitumen mined, 40% is upgraded in Canada to synthetic crude oil (SCO) and shipped to open market refineries, while the remaining 60% is diluted typically with natural gas condensate liquids to reduce bitumen viscosity so that it can be transported in pipelines to more complex high-conversion refineries that have better ability to upgrade the sour crude. However, more complex high-conversion refineries are expensive to build. Also, while effective, dilution may reduce effective pipeline capacity, in embodiments, depending on the processes employed by between 30% to over 50%. Thus, a value proposition exists for partial upgrading of bitumen as a means to increase effective pipeline capacity.

Whether conducting a partial or more complete upgrading, the processes are similar and may include: 1) Diluent Recovery: Removal of the pipeline required transportation diluent (naphthenic, paraffinic or natural gas derived condensate solvent) is conducted to separate and send back to the bitumen production facility.; 2) Upgrading of Hydrogen/Carbon (H/C) Ratio: Typically done through hydrogenation (hydrogen addition) or through carbon removal via coking or thermal cracking reactions.; 3) Heavy to Light Conversion: Heavy bitumen hydrocarbon compounds can be converted to lighter compounds through a) fractionation/distillation of the separate boiling point components or b) cracking of the long-chain complex hydrocarbon molecules to short-chain simpler hydrocarbons.; 4) Impurity Removal: Bitumen contains significant amounts of thiophenic sulfur and nitrogen that may be removed (typically in the form of hydrogen sulfide and ammonia).

Upgrading of bitumen for purpose of pipeline transport may require less than 0.5% mineral solids and water and a viscosity less than 350 cP before the crude oil stream can be transported.

While bitumen or sour crude upgrading technology is a well-established commercial process, it still suffers from a number of inefficiencies, both technical and economic. Carbon fouling of equipment and catalyst, plant size and number of process unit operations, catalyst expense and overall capital cost are less than desirable and limit the industry. Further, significant capacity is lost in transport of mined bitumen due to pipeline dilution necessity.

In the disclosed improved process for bitumen upgrading, extracted oil sand or surface mined oil sand may be added to an electromagnetically microwave driven reactor with selected reactants and/or catalyst to upgrade the bitumen to a lower viscosity and lower contaminant (such as sulfur & nitrogen) crude oil capable of being pipeline-transportable, possibly without dilution. Specific bitumen upgrading operations may have unique plant designs and operating conditions. The embodiments herein are for both surface-mined bitumen and deep mine-extracted bitumen. The systems and methods describe herein could be integrated into various insertion points within an operator's plant based on their specific design and intentions.

Surface-mined bitumen (with the requisite degree of solids and water separation) may be directly added to the pressurized microwave reactor along with carrier solvent and/or other supplemental hydrogenation agent such as methane. The naturally mined sand and inorganic content of the oil sand may provide significant microwave activity, and/or a microwave catalyst may be added to energize the microwave focused reaction site to promote hydrogenation up to a temperature of between about 150° C.-400° C. (or possibly higher or lower) possibly as supplied via an external heat source combined with the microwave, which may be tuned to the reaction. As the hydrogenation proceeds, light gases, $H_2S$ and $NH_3$ may be evolved and separated. The remaining effluent may be passed through a fractional distillation process to purify (for example, solid sulfur compound removal can be accomplished) the desired partially upgraded bitumen and recover the catalyst and solvent for recycling. In another embodiment, a fixed sulfur-tolerant catalyst structure may be affixed within the reactor eliminating the catalyst recover step. Depending on the final destination specification, the partially upgraded bitumen may be further desulfurized via a conventional thermal or embodied microwave-driven oxidative sulfur polishing reactor. In embodiments, a staged microwave reactor may be possible within the embodiments described herein with the addition of appropriate catalyst and oxidative source. Alternatively, in embodiments a secondary microwave reactor with an optimized catalyst, oxidant and specific reactor design tuned to oxidative desulfurization of the bitumen could be employed.

It may be possible to utilize the inherent catalytic properties of the as-mined oil sand (including from bitumen, sand, metals and the like) and perform a reaction with appropriate solvent and/or supplemental hydrogenation agent to directly affect reaction without catalyst addition.

In embodiments, given the cost to retrofit oil sands operations (such as for treating raw bitumen), the methods and systems described herein may be suited for new oil sands operations to be built. For existing oil sands operations, and those built without the methods and systems described herein, it may be advantageous to use the methods and systems described herein following a froth treatment step (such as where water and fine solids are removed from bitumen froth using hydrocarbon-based (e.g. naphtha-based hydrocarbon and a lighter paraffinic solvent) gravity separation, and the bitumen is already at 80° C.-90° C., or another temperature), to reduce viscosity and desulfurize.

For deep mined/extracted bitumen, the process is similar to the surface-mined example with lessened preparation and separation, but, in embodiments, catalyst addition may be a necessity. This embodiment may have an even higher degree of integration possible with the mining operations that extract a cleaner and pre-heated bitumen feed. Features may include: lower temperature reduces carbon deposition and catalyst fouling, modular/direct integration at the mine source, utilization of readily available natural gas/methane, lower energy, less processing steps and reactor vessels, and lower capital cost.

Figure 5:
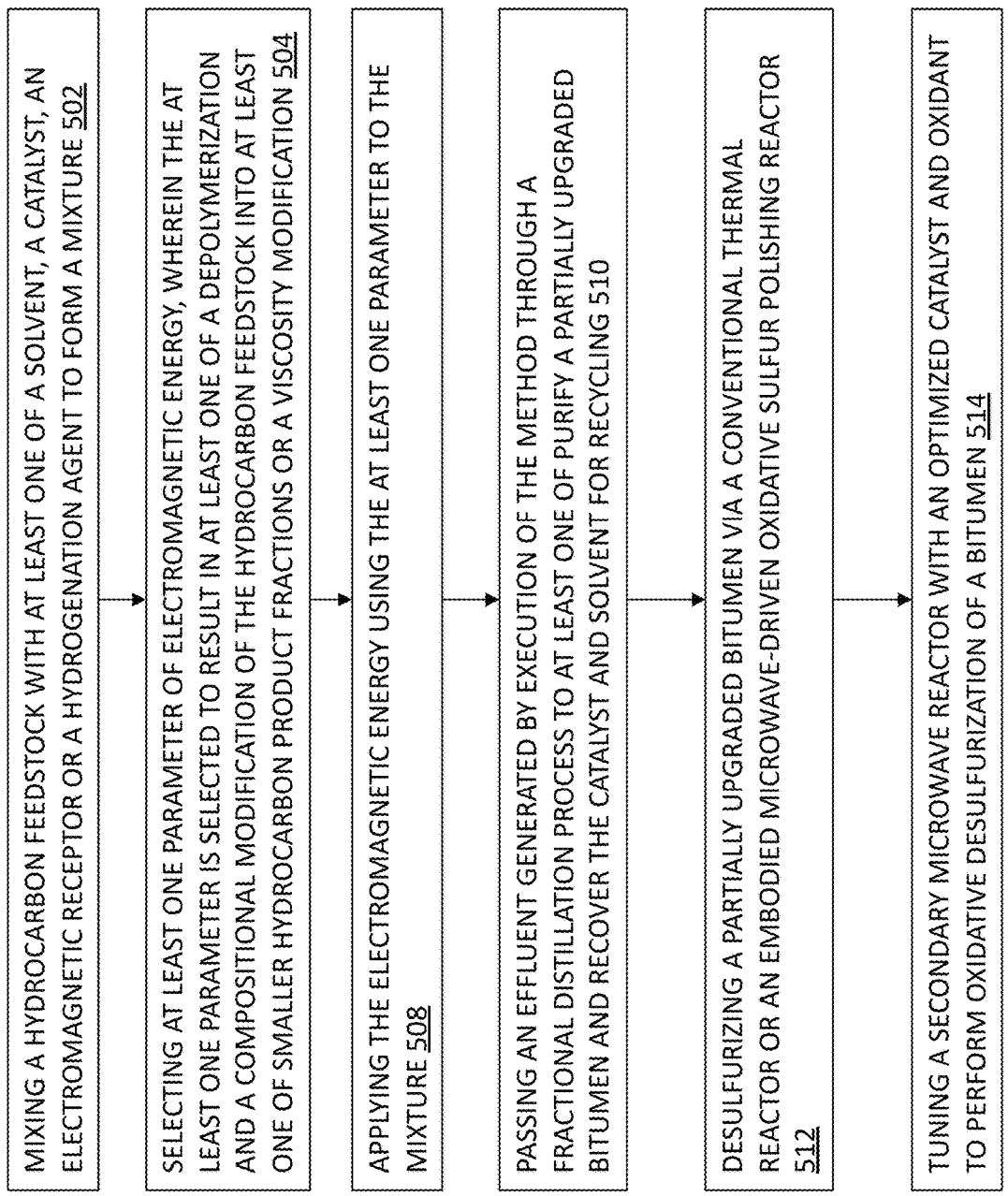
FIG. 5 depicts a method of the disclosure.

In an aspect, a method (such as that of FIG. 5) may include mixing a hydrocarbon feedstock with at least one of a solvent, a catalyst, an electromagnetic receptor or a hydrogenation agent to form a mixture 502; selecting at least one parameter of electromagnetic energy, wherein the at least one parameter is selected to result in at least one of a depolymerization and a compositional modification of the hydrocarbon feedstock into at least one of smaller hydrocarbon product fractions or a viscosity modification 504; and applying the electromagnetic energy using the at least one parameter to the mixture 508. The hydrocarbon feed may be at least one of a coal, a lignite, a subbituminous coal, a bituminous coal, an anthracite, an oil sand, a bitumen or a heavy oil. The oil sand or bitumen may be surface-mined or deep extraction. The solvent may be a hydrocarbon. The solvent may optionally include a hydrogenation agent. The solvent may be a recycled fraction. The hydrogenation agent may be at least one of hydrogen, a natural gas, a biomass or a hydrocarbon compound. The catalyst may at least one of facilitate hydrogenation of higher hydrocarbon compounds, assist in the dehydrogenation of the natural gas species, react with the sulfur bearing hydrocarbons to form hydrogen sulfide, or react with the sulfur and forms a metal sulfide that then becomes a catalytic hydrogenation agent and can later be separated from a product for desulfurization. The electromagnetic receptor may serve as a support for the catalyst and comprises at least one of carbon or a metal oxide. A support for the catalyst may be at least one of a bi-functional microwave receptor and a sulfur sorption media.

The electromagnetic energy may be a microwave energy between 300 MHz and 300 GHz and may be at least one of continuous, variable, or pulsed. The electromagnetic energy may be a radio wave that is less than 300 MHz, wherein the radio wave energy is continuous, variable, or pulsed. Products of the method include at least one of light gaseous hydrocarbons, middle hydrocarbon distillates, heavy hydrocarbon distillates, tars, pitch, solid carbon, lower viscosity bitumen, or upgraded hydrocarbon distillate fractions. The electromagnetic energy may be tuned to maximize solvent uptake through water exchange. Supplemental thermal heat may be added to bring a temperature of a reactor executing the method to a point of chemical reaction. The reactor may be batch, continuous, fixed bed, or fluidized bed. The method may be performed under a pressure of between 1 atmosphere and 80 atmospheres. The temperature may be between 100 degrees centigrade and 1000 degrees centigrade. At least one of a middle distillate product fraction or a spent catalyst fraction of the method may be recycled to the inlet of a reactor executing the method. A spent catalyst fraction may be recycled to the inlet of a reactor executing the method. The method may further include passing an effluent generated by execution of the method through a fractional distillation process to at least one of purify a partially upgraded bitumen and recover the catalyst and solvent for recycling 510. The method may further include further desulfurizing a partially upgraded bitumen via a conventional thermal reactor or an embodied microwave-driven oxidative sulfur polishing reactor 512. The method may further include tuning a secondary microwave reactor with an optimized catalyst and oxidant to perform oxidative desulfurization of the bitumen 514.

In an aspect, a reactor may include a reservoir that receives a slurry of a coal and a solvent; an electromagnetic energy generator positioned to apply electromagnetic energy to the slurry in the reservoir; at least one heating band positioned on a portion of the reservoir to impart thermal energy to the slurry; and an outflow of the reservoir for obtaining digestate from the reservoir.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions, and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions, or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client, and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of a program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code, and/or instructions. A central repository may provide program instructions to be executed on different devices. In this implementation, the remote repository may act as a storage medium for program code, instructions, and programs.

In embodiments, one or more of the controllers, circuits, systems, data collectors, storage systems, network elements, or the like as described throughout this disclosure may be embodied in or on an integrated circuit, such as an analog, digital, or mixed signal circuit, such as a microprocessor, a programmable logic controller, an application-specific integrated circuit, a field programmable gate array, or other circuit, such as embodied on one or more chips disposed on one or more circuit boards, such as to provide in hardware (with potentially accelerated speed, energy performance, input-output performance, or the like) one or more of the functions described herein. This may include setting up circuits with up to billions of logic gates, flip-flops, multiplexers, and other circuits in a small space, facilitating high speed processing, low power dissipation, and reduced manufacturing cost compared with board-level integration. In embodiments, a digital IC, typically a microprocessor, digital signal processor, microcontroller, or the like may use Boolean algebra to process digital signals to embody complex logic, such as involved in the circuits, controllers, and other systems described herein. In embodiments, a data collector, an expert system, a storage system, or the like may be embodied as a digital integrated circuit ("IC"), such as a logic IC, memory chip, interface IC (e.g., a level shifter, a serializer, a deserializer, and the like), a power management IC and/or a programmable device; an analog integrated circuit, such as a linear IC, RF IC, or the like, or a mixed signal IC, such as a data acquisition IC (including A/D converters, D/A converter, digital potentiometers) and/or a clock/timing IC.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be configured for use with any kind of private, community, or hybrid cloud computing network or cloud computing environment, including those which involve features of software as a service ("SaaS"), platform as a service ("PaaS"), and/or infrastructure as a service ("IaaS").

The methods, program codes, and instructions described herein and elsewhere may be implemented on a cellular network having multiple cells. The cellular network may either be frequency division multiple access ("FDMA") network or code division multiple access ("CDMA") network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory ("RAM"); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the Figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(1). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A method, comprising:
mixing a hydrocarbon feedstock with a catalyst and an electromagnetic receptor to form a mixture,
wherein the electromagnetic receptor serves as a support for the catalyst and includes at least one of carbon and a metal oxide;
selecting at least one parameter of electromagnetic energy,
wherein the at least one parameter is selected to result in at least one of a depolymerization and a compositional modification of the hydrocarbon feedstock into at least one of smaller hydrocarbon product fractions or a viscosity modification; and applying the electromagnetic energy using the at least one parameter to the mixture.

2. The method of claim 1, wherein the hydrocarbon feedstock is at least one of a coal, a lignite, a subbituminous coal, a bituminous coal, an anthracite, an oil sand, a bitumen or a heavy oil; and wherein products of the method comprise at least one of light gaseous hydrocarbons, middle hydrocarbon distillates, heavy hydrocarbon distillates, tars, pitch, solid carbon, lower viscosity bitumen, or upgraded hydrocarbon distillate fractions.

3. The method of claim 1, wherein the catalyst at least one of facilitates hydrogenation of higher hydrocarbon compounds, assists in a dehydrogenation of a natural gas species, reacts with a sulfur-bearing hydrocarbon to form hydrogen sulfide, or reacts with a sulfur and forms a metal sulfide that then becomes a catalytic hydrogenation agent and can later be separated from a product for desulfurization.

4. The method of claim 1, wherein the electromagnetic energy is a microwave energy between 300 MHz and 300 GHz.

5. The method of claim 4, wherein the microwave energy is at least one of continuous, variable, or pulsed.

6. The method of claim 1, wherein the electromagnetic energy is a radio wave that is less than 300 MHz.

7. The method of claim 1, wherein the electromagnetic energy is tuned to maximize solvent uptake through water exchange.

8. The method of claim 1, wherein supplemental thermal heat is added to bring a temperature of a reactor executing the method to a point of chemical reaction.

9. The method of claim 1, wherein the method is performed under a pressure of between 1 atmosphere and 80 atmospheres; and
wherein the temperature can be up to 1000 degrees centigrade.

10. The method of claim 1, wherein at least one of a middle distillate product fraction or a spent catalyst fraction of the method is recycled to an inlet of a reactor executing the method.

11. The method of claim 1, further comprising:
passing an effluent generated by execution of the method through a fractional distillation process to at least one of purify a partially upgraded bitumen and recover the catalyst and solvent for recycling.

12. The method of claim 1, further comprising:
further desulfurizing a partially upgraded bitumen via a conventional thermal reactor or an embodied microwave-driven oxidative sulfur polishing reactor.

13. The method of claim 1, further comprising
tuning a secondary microwave reactor with an optimized catalyst and oxidant to perform oxidative desulfurization of a bitumen.

14. The method of claim 1, wherein at least one of a solvent and a hydrogenation agent are mixed with the hydrocarbon feedstock in the mixing step.

15. A method, comprising:
mixing a hydrocarbon feedstock with a catalyst and an electromagnetic receptor to form a mixture,
wherein the electromagnetic receptor serves as a support for the catalyst and includes at least one of a bi-functional microwave receptor and a sulfur sorption media;
selecting at least one parameter of electromagnetic energy,
wherein the at least one parameter is selected to result in at least one of a depolymerization and a compositional modification of the hydrocarbon feedstock into at least one of smaller hydrocarbon product fractions or a viscosity modification; and
applying the electromagnetic energy using the at least one parameter to the mixture.

16. The method of claim 15, wherein the hydrocarbon feedstock is at least one of a coal, a lignite, a subbituminous coal, a bituminous coal, an anthracite, an oil sand, a bitumen or a heavy oil; and wherein products of the method comprise at least one of light gaseous hydrocarbons, middle hydrocarbon distillates, heavy hydrocarbon distillates, tars, pitch, solid carbon, lower viscosity bitumen, or upgraded hydrocarbon distillate fractions.

17. The method of claim 15, wherein the electromagnetic energy is a microwave energy between 300 MHz and 300 GHz.

18. The method of claim 17, wherein the microwave energy is at least one of continuous, variable, or pulsed.

19. The method of claim 15, wherein the electromagnetic energy is a radio wave that is less than 300 MHz.

* * * * *